US010178177B2

(12) United States Patent
McLaughlin et al.

(10) Patent No.: US 10,178,177 B2
(45) Date of Patent: Jan. 8, 2019

(54) APPARATUS AND METHOD FOR USING AN INTERNET OF THINGS EDGE SECURE GATEWAY

(71) Applicant: Honeywell International Inc., Morris Plains, NJ (US)

(72) Inventors: Paul F. McLaughlin, Ambler, PA (US); James A. Strilich, Phoenix, AZ (US); Andrew Duca, Phoenix, AZ (US); Ellen B. Hawkinson, Phoenix, AZ (US); Joseph Felix, Jenkintown, PA (US)

(73) Assignee: Honeywell International Inc., Morris Plains, NJ (US)

( * ) Notice: Subject to any disclaimer, the term of this patent is extended or adjusted under 35 U.S.C. 154(b) by 242 days.

(21) Appl. No.: 14/963,013

(22) Filed: Dec. 8, 2015

(65) Prior Publication Data

US 2017/0163444 A1 Jun. 8, 2017

(51) Int. Cl.
*G06F 15/16* (2006.01)
*H04L 29/08* (2006.01)
*H04L 12/66* (2006.01)
*H04L 29/06* (2006.01)

(52) U.S. Cl.
CPC ............ *H04L 67/12* (2013.01); *H04L 12/66* (2013.01); *H04L 67/10* (2013.01); *H04L 69/08* (2013.01)

(58) Field of Classification Search
CPC .......... H04L 12/66; H04L 67/12; H04L 67/10
USPC .......... 709/227–228, 230, 232; 370/466–467
See application file for complete search history.

(56) References Cited

U.S. PATENT DOCUMENTS

| 7,466,713 | B2 |  | 12/2008 | Saito |
| 7,970,830 | B2 |  | 6/2011 | Staggs et al. |
| 8,320,940 | B2 | * | 11/2012 | Chen .................... H04W 88/08 370/238 |
| 8,527,653 | B2 | * | 9/2013 | Maria ................... H04W 88/16 370/328 |
| 8,566,452 | B1 | * | 10/2013 | Goodwin, III ...... H04L 63/0281 709/227 |
| 8,875,223 | B1 |  | 10/2014 | Chen et al. |
| 9,246,877 | B2 |  | 1/2016 | Dalvi et al. |
| 9,755,894 | B2 | * | 9/2017 | Matthieu ................ H04L 67/12 |
| 9,762,756 | B2 | * | 9/2017 | Anezaki ............. H04L 12/6418 |
| 2006/0067209 | A1 |  | 3/2006 | Sheehan et al. |

(Continued)

FOREIGN PATENT DOCUMENTS

WO 2006126959 A2 11/2006

OTHER PUBLICATIONS

Notification of Transmittal of the International Search Report and The Written Opinion of the International Searching Authority, or the Declaration dated Feb. 13, 2017 in connection with International Patent Application No. PCT/US2016/061537.

(Continued)

*Primary Examiner* — Bharat Barot

(57) ABSTRACT

A gateway is configured to perform a method that includes receiving data from a first device using a first protocol. The first protocol is a cloud based protocol. The method also includes determining that the received data is intended for a second device that uses a second protocol. The method further includes converting the received data from the first protocol to the second protocol. In addition, the method includes transmitting the received data to the second device via the second protocol.

17 Claims, 4 Drawing Sheets

(56) References Cited

U.S. PATENT DOCUMENTS

| | | |
|---|---|---|
| 2006/0164199 A1 | 7/2006 | Gilde et al. |
| 2013/0159490 A1 | 6/2013 | Huh et al. |
| 2013/0212214 A1 | 8/2013 | Lawson et al. |
| 2013/0290548 A1 | 10/2013 | He |
| 2014/0032774 A1* | 1/2014 | Lowekamp ............. H04L 67/08 709/230 |
| 2015/0084787 A1 | 3/2015 | Jericho et al. |
| 2016/0127514 A1* | 5/2016 | Maksumov ............. H04L 67/10 709/202 |
| 2016/0366292 A1* | 12/2016 | Anezaki ............. H04L 12/6418 |
| 2018/0013579 A1* | 1/2018 | Fairweather .......... H04L 67/125 |

OTHER PUBLICATIONS

Paul F. McLaughlin, et al., "Apparatus and Method for Using a Security Appliance with IEC 61131-3", U.S. Appl. No. 14/962,904, 29 pages.

Paul F. McLaughlin, et al., "Apparatus and Method for Using a Distributed Systems Architecture (DSA) in an Internet of Things (IOT) Edge Appliance", U.S. Appl. No. 14/962,722, 26 pages.

\* cited by examiner

US 10,178,177 B2

APPARATUS AND METHOD FOR USING AN INTERNET OF THINGS EDGE SECURE GATEWAY

TECHNICAL FIELD

This disclosure is generally directed to the internet of things (IoT). More specifically, this disclosure is directed to an IoT edge secure gateway in an industrial process control and automation system.

BACKGROUND

The internet of things (IoT) is the marriage of large-scale information technology (IT) systems (such as cloud-based systems) with physical plants such as manufacturing and residential (or campus) controls through endpoint devices that provide sensing, actuation, information collection and display, and automation decision logic. The integration of IT systems with physical systems and devices can be manifested through a gateway.

SUMMARY

This disclosure relates to an apparatus and method for using an interne of things (IoT) Edge secure gateway in a process control system.

In a first embodiment, a method is provided. The method includes receiving, by a gateway, data from a first device using a first protocol. The first protocol is a cloud based protocol. The method also includes determining, by the gateway, that the received data is intended for a second device that uses a second protocol. The method further includes converting, by the gateway, the received data from the first protocol to the second protocol. In addition, the method includes transmitting, by the gateway, the received data to the second device via the second protocol.

In a second embodiment, a gateway including processing circuitry is provided. The processing circuitry is configured to receive data from a first device using a first protocol. The first protocol is a cloud based protocol. The processing circuitry is also configured to determine that the received data is intended for a second device that uses a second protocol. The processing circuitry is further configured to convert the received data from the first protocol to the second protocol. In addition, the processing circuitry is configured to transmit the received data to the second device via the second protocol.

In a third embodiment, a non-transitory, computer-readable medium storing one or more executable instructions is provided. The one or more executable instructions, when executed by one or more processors, cause the one or more processors to receive data from a first device using a first protocol. The first protocol is a cloud based protocol. The one or more executable instructions, when executed by the one or more processors, also cause the one or more processors to determine that the received data is intended for a second device that uses a second protocol. The one or more executable instructions, when executed by the one or more processors, further cause the one or more processors to convert the received data from the first protocol to the second protocol. In addition, the one or more executable instructions, when executed by the one or more processors, cause the one or more processors to transmit the received data to the second device via the second protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The internet of things (IoT) is the marriage of large-scale information technology (IT) systems (such as cloud-based systems) with physical plants such as manufacturing and residential (or campus) controls through endpoint devices that provide sensing, actuation, information collection and display, and automation decision logic. The integration of IT systems with physical systems and devices can be manifested through a gateway that is secure, scalable, elastic, robust, includes flexible topology and deployment models, is system independent (such as automation systems and cloud fabric systems), and is easy to set-up and maintain with long term sustainability.

Figure 1:
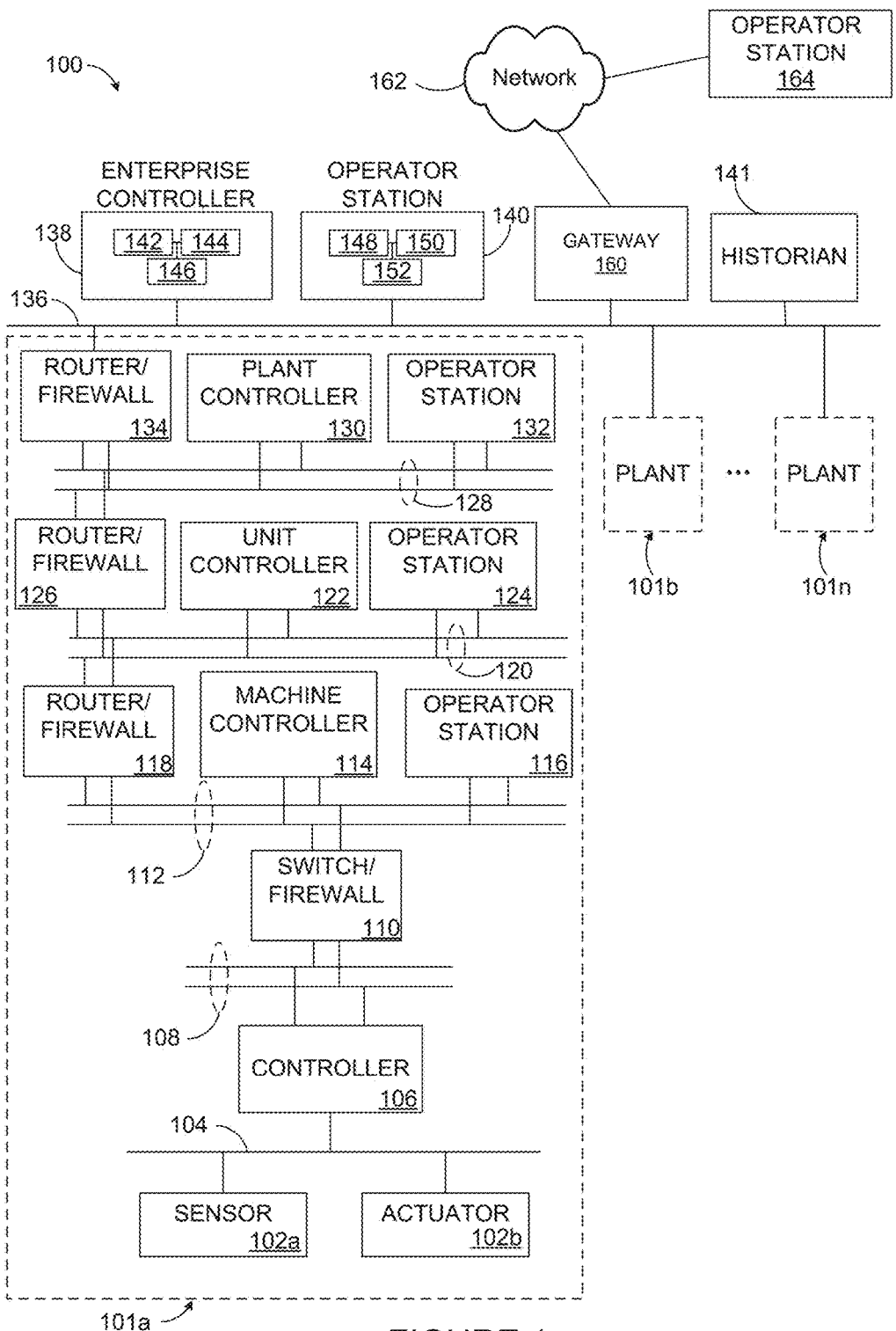
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/ firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controllers 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

In accordance with this disclosure, the system 100 also includes a gateway 160. The gateway 160 integrates the plants 101a through 101n and the network 136 with a cloud network 162 and an operator station 164. In some embodiments, the gateway 160 is an IoT Edge secure gateway appliance, and hereafter will be referred to as the IoT Edge secure gateway 160. The IoT Edge secure gateway 160 can include a ONEWIRELESS gateway providing high availability and mesh capability. The IoT Edge secure gateway 160 also includes a Common Embedded Platform for communication protocols as well as redundancy, design, and security features. The IoT Edge secure gateway 160 includes Intuition and Experion for system connectivity, distributed system architecture, and service oriented architecture. The IoT Edge secure gateway 160 includes OPC unified architecture (UA) for legacy and future system integration.

The IoT Edge secure gateway 160 is a platform based on a suitable embedded real-time operating system (OS) (such as a reduced form of LINUX). On the real-time OS, a common protocol machine is layered to deliver "downstream" connectivity to on premise physical devices and systems using open protocols. These protocols can include Ethernet/IP, OPC UA, ProfiNet, IEC-61850, Modbus/TCP, HART/IP, and the like. Non-Ethernet based protocols can also be implemented using a serial communications port (such as Modbus/RTU). Data collected from these downstream protocols is mapped to a unifying abstraction layer that provides a consistent namespace and set of data services for information publication to a cloud layer.

A communication stack to the cloud network 162 includes OPC UA and its core services for synchronous and asynchronous data publication, alarms and event publication, history data transfer, blind record or "BLOB" transfer, and the like. Other cloud protocols can be supported as an alternative to or in addition to OPC UA. The other cloud protocols can have similar services including event streaming to an event hub in the cloud and data access services. The IoT Edge gateway 160 can be located at various layers in a control system, and can provide security features including encryption and certificate based authentication. These services are available for both cloud based connections and on premise system and device connections. The IoT Edge gateway 160 provides secure guard traffic flow bi-directionally to protect both the cloud and the on premise systems and devices (such as the devices within the plant 101a as well as the enterprise controllers 138 and the operator stations 140. Features of the IoT Edge secure gateway 160 are discussed further herein.

In an embodiment, the networks 136 can represent a cloud network configured to facilitate communication between the IoT Edge secure gateway 160 and at least one of the enterprise controllers 138, the operator stations 140, the historian 141, or one or more plants 101b-101n via wireless communication.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Additionally, for example, the networks 120 and 128 can be a single network and also a non-FTE network with single or dual cables (such as to multiple sections). Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2:
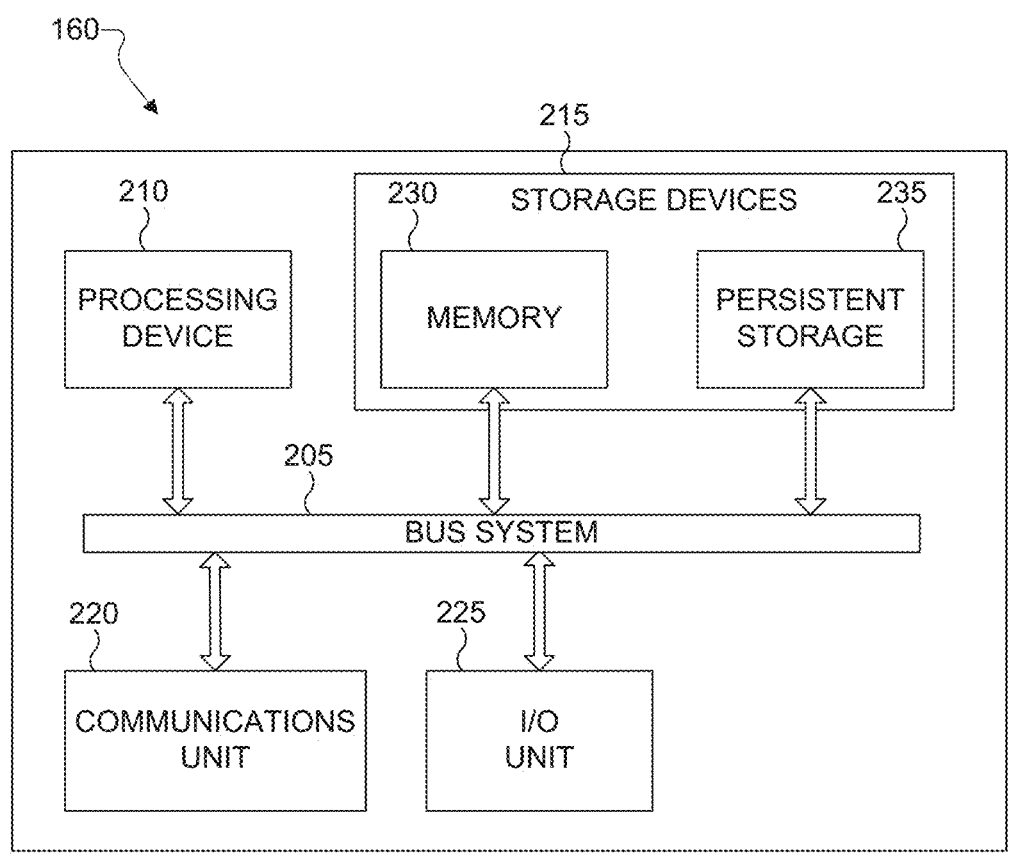
FIG. 2 illustrates details of an example gateway according to this disclosure.

FIG. 2 illustrates an example an IoT Edge secure gateway 160 according to this disclosure. As shown in FIG. 2, the IoT Edge secure gateway 160 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 136. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

The IoT Edge secure gateway 160 includes several characteristics. For example, the IoT Edge secure gateway 160 provides a core security layer for the equipment (such as the controllers, actuators, and sensors) of the plant 101a. The IoT Edge secure gateway 160 performs deep packet inspection of incoming traffic from both the plant 101a and the network 136. The IoT Edge secure gateway 160 can have exclusive connections between the operator station 164 and the network 136 via the cloud network 162.

The IoT Edge secure gateway 160 is scalable. For example, the IoT Edge secure gateway 160 provides a mesh to ensure flexible scalability and deployment of the gateway 160 with the plant 101a and the network 136. The IoT Edge secure gateway 160 is elastic. For example, new appliances (such as additional controllers, sensors, and actuators) can be added on-line to an existing set of appliances. Also, when the IoT Edge secure gateway 160 is used with multiple automation system conduits, the IoT Edge secure gateway 160 will self-manage traffic loads to balance demand needs of each of the multiple automation system conduits.

The IoT Edge secure gateway 160 is also robust. For example, the IoT Edge secure gateway 160 utilizes advanced mesh redundancy to ensure that failure or repair of any one or more nodes does not influence the flow of data within the system 100. The IoT Edge secure gateway 160 is flexible. For example, the IoT Edge secure gateway 160 can be implemented with any open, standard interne protocol (IP) based industrial or commercial protocol. The IoT Edge secure gateway 160 is system independent. For example, the IoT Edge secure gateway 160 can integrate a cloud system with open interfaces. The IoT Edge secure gateway 160 can also integrate automation systems with at least one open protocol such as OPC unified architecture (UA).

The IoT Edge secure gateway 160 provides an ease of use. The IoT Edge secure gateway 160 can "self-learn" a system configuration and provide automatic routing and load balancing for traffic flow between plants. The IoT Edge secure gateway 160 is sustainable. The IoT Edge secure gateway 160 includes a sustainable core technology such as ARM and LINUX and is OS and microprocessor dependent. The sustainable core technology can also be ARM/Windows IoT OS that runs against ARM. The IoT Edge secure gateway 160 includes can be easily deployed. For example, the IoT Edge secure gateway 160 to support a delivery via specialized hardware appliances embedded in devices as well as a software format that can be delivered as part of an application and can be hosted in a software execution environment. The IoT Edge secure gateway 160 is future proof. The IoT Edge secure gateway 160 updates itself delivering new features and capabilities over its life cycle.

The IoT Edge secure gateway 160 includes a distributed architecture. For example, the IoT Edge secure gateway 160 enables multiple sites to be brought together and projected or displayed as a homogeneous system. The IoT Edge secure gateway 160 can be amplified. The IoT Edge secure gateway 160 amplifies inferior or legacy devices enabling advanced capabilities such as unified name space, alarms, history, and the like.

The IoT Edge secure gateway 160 provides simple connectivity so that one or more IoT Edge secure gateways 160 can be connected to different devices including the devices shown in the system 100 of FIG. 1. For example, while FIG.

1 illustrates that the IoT Edge secure gateway 160 is positioned between the cloud network 162 and the network 136, the gateway 160 can also be positioned between the network 136 and the router/firewall 128, the network 128 and the router/firewall 126, the network 120 and the router/firewall 118, the network 112 and the switch/firewall 110, the network 108 and the controller 106, the network 104 and the sensor 102a, the network 104 and the actuator 102b. The IoT Edge secure gateway 160 can also be positioned between plant controller 130 and the network 128, the operator station 132 and the network 128, the unit-level controller 122 and the network 120, the operation station 124 and the network 120, the machine-level controller 114 and the network 112, or the operator station 116, and the network 112. The IoT Edge secure gateway 160 can also be positioned between the network 136 and the plant 10 lb or the network 136 and the plant 101n. A plurality of IoT Edge secure gateways 160 can be positioned at different location within the system 100 has described herein.

Although FIG. 2 illustrates one example of an IoT Edge secure gateway 160, various changes may be made to FIG. 2. For example, the gateway can come in a wide variety of configurations. The gateway 160 shown in FIG. 2 is meant to illustrate one example type of gateway and does not limit this disclosure to a particular type of gateway.

Figure 3:
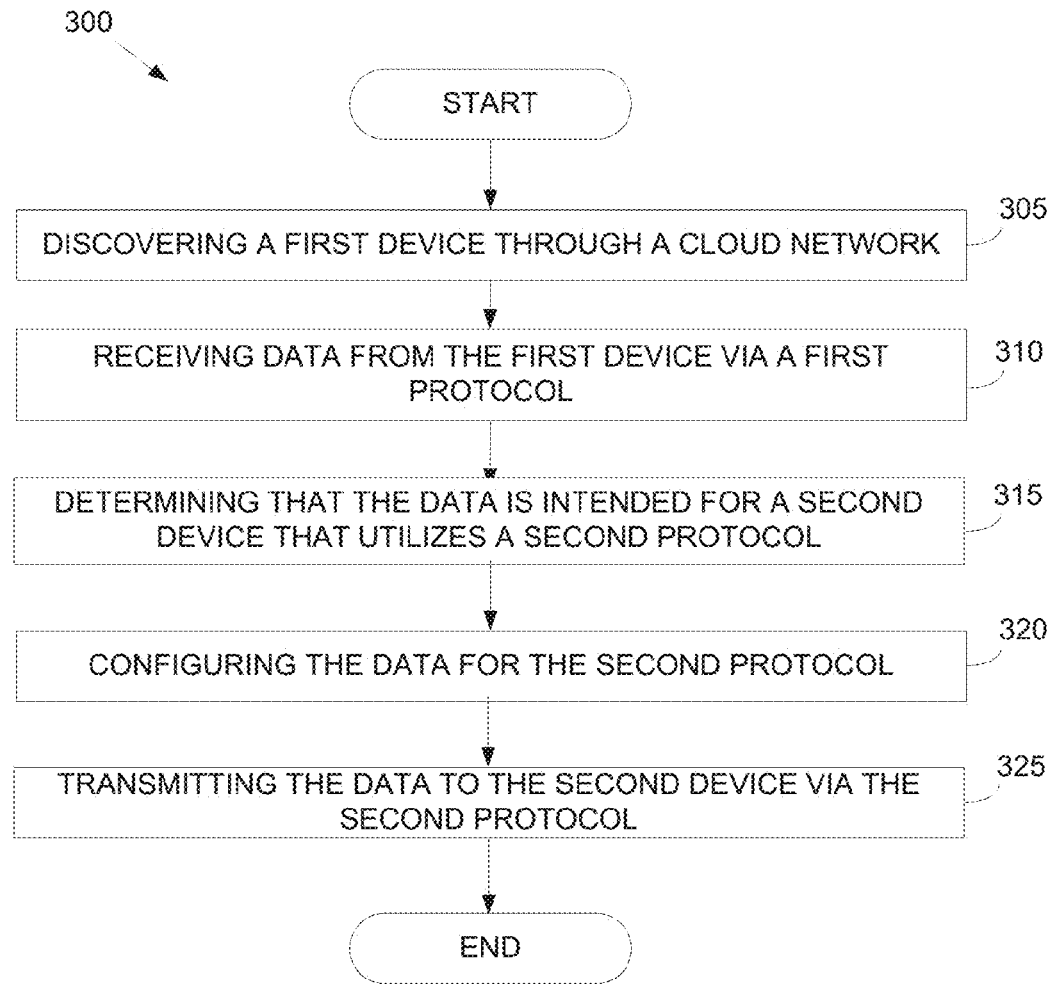
FIGS. 3 and 4 illustrate example methods according to this disclosure.

FIG. 3 illustrates an example method 300 according to this disclosure. The method 300 can be implemented using any suitable devices and in any suitable systems. For example, as discussed below, the method 300 is implemented with an IoT Edge secure gateway 160 discussed herein. For ease of explanation, the method 300 is described with respect to the system 100 of FIG. 1.

As shown in FIG. 3, at step 305, an IoT Edge secure gateway 160 discovers a first device via a cloud network 162. The first device utilizes a first communication protocol. The first protocol can include OPC UA and the like. At step 310, the IoT Edge secure gateway 160 receives data from the first device using the first communication protocol. The IoT Edge secure gateway 160 includes a Common Embedded Platform for communication protocols as well as redundancy, design, and security features. At step 315, the IoT Edge secure gateway 160 analyzes the received data and determines a second device that is intended to receive the data. The second device utilizes a second communication protocol different from the first communication protocol. In an embodiment, the first communication protocol and the second communication protocol are not compatible protocols. The second protocol can include Ethernet/IP, OPC UA, ProfiNet, IEC-61850, Modbus/TCP, HART/IP, and the like. The second protocol can also include non-Ethernet based protocols that can also be implemented using a serial communications port (such as Modbus/RTU). In an embodiment, the first protocol and the second protocol can be the same protocol. At step 320, the IoT Edge secure gateway 160, using the Common Embedded Platform, converts the received data to the second communication protocol. For example, the IoT Edge secure gateway 160 includes data collected from downstream protocols that is mapped to a unifying abstraction layer that provides a consistent namespace and set of data services for information publication to a cloud layer. The IoT Edge secure gateway 160 uses the collected and mapped data to identify and convert the received data from the first communication protocol to the second communication protocol. At step 325, the IoT Edge secure gateway 160 transmits the data using the second communication protocol to the second device.

Although FIG. 3 illustrates one example of the method 300, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

Figure 4:
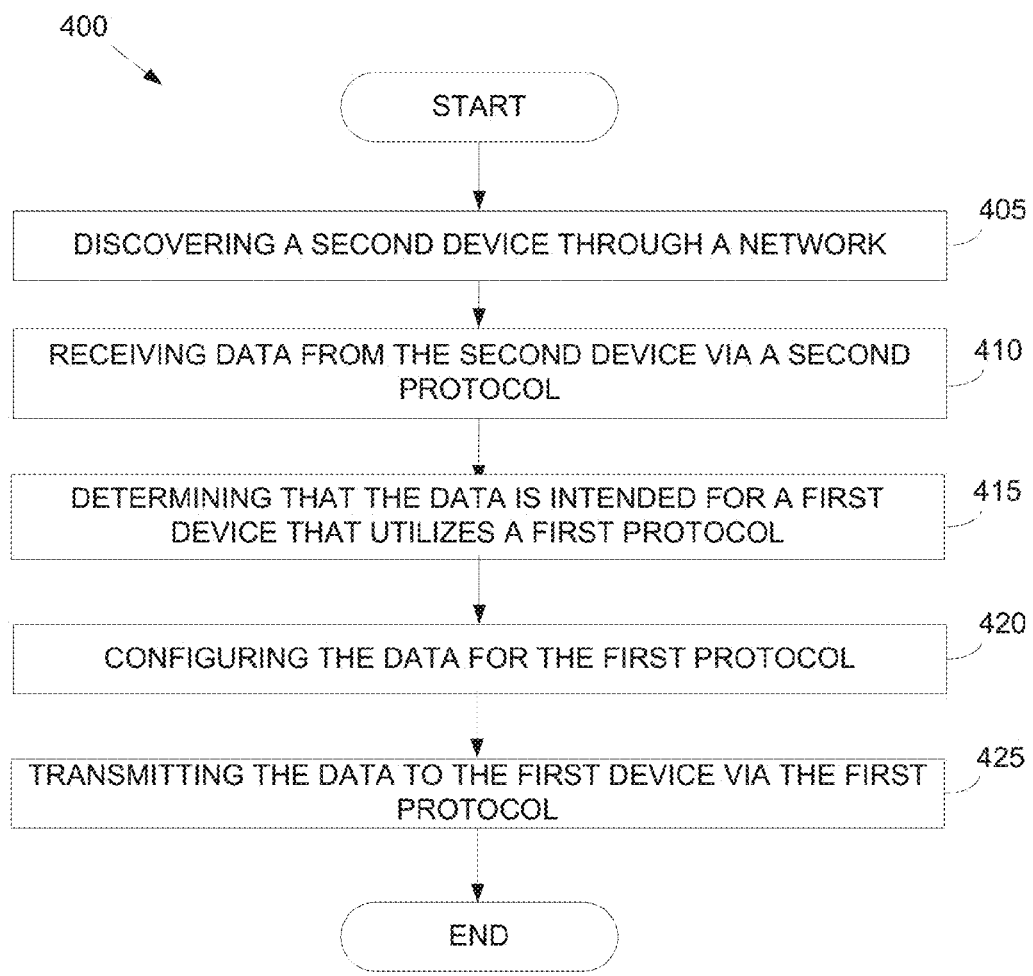

FIG. 4 illustrates an example method 400 according to this disclosure. The method 400 can be implemented using any suitable devices and in any suitable systems. For example, as discussed below, the method 400 is implemented with an IoT Edge secure gateway 160 discussed herein. For ease of explanation, the method 400 is described with respect to the system 100 of FIG. 1.

As shown in FIG. 4, at step 405, an IoT Edge secure gateway 160 discovers a second device within a network (such as a legacy network 136). The second device utilizes a second communication protocol. The second protocol can include Ethernet/IP, OPC UA, ProfiNet, IEC-61850, Modbus/TCP, HART/IP, and the like. The second protocol can also include non-Ethernet based protocols that can also be implemented using a serial communications port (such as Modbus/RTU). At step 410, the IoT Edge secure gateway 160 receives data from the second device using the second communication protocol. In an embodiment, the IoT Edge secure gateway 160 can receive data from the second device in response to transmitting data to the second device (for example, in response to transmitting data as described at step 325 of FIG. 3). The IoT Edge secure gateway 160 includes a Common Embedded Platform for communication protocols as well as redundancy, design, and security features. At step 415, the IoT Edge secure gateway 160 analyzes the received data and determines a first device that is intended to receive the data. The first device utilizes a first communication protocol different from the second communication protocol. In an embodiment, the second communication protocol and the first communication protocol are not compatible protocols. The first protocol can include OPC UA and the like. At step 420, the IoT Edge secure gateway 160, using the Common Embedded Platform, converts the received data to the first communication protocol. For example, the IoT Edge secure gateway 160 includes data collected from downstream protocols that is mapped to a unifying abstraction layer that provides a consistent namespace and set of data services for information publication to a cloud layer. The IoT Edge secure gateway 160 uses the collected and mapped data to identify and convert the received data from the second communication protocol to the first communication protocol. At step 425, the IoT Edge secure gateway 160 transmits the data using the first communication protocol to the first device.

Although FIG. 4 illustrates one example of the method 400, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    receiving, by a gateway, data from a first device using a first protocol, wherein the first protocol is a cloud based protocol;
    determining, by the gateway, that the received data is intended for a second device that uses a second protocol;
    identifying, by the gateway, the second protocol using a unified abstraction layer that maps data to protocols to provide a consistent namespace and set of data services for information publication to a cloud layer;
    converting, by the gateway, the received data from the first protocol to the second protocol; and
    transmitting, by the gateway, the received data to the second device via the second protocol.

2. The method of claim 1, wherein the first protocol and the second protocol are different protocols.

3. The method of claim 1, wherein the first protocol utilizes OPC unified architecture (UA).

4. The method of claim 1, wherein the second protocol comprises at least one of Ethernet/IP, OPC UA, ProfiNet, IEC-61850, Modbus/TCP, HART/IP, or Modbus/RTU.

5. The method of claim 1, further comprising:
    receiving, by the gateway, data from the second device via the second protocol in response to transmitting the data to the second device.

6. The method of claim 1, further comprising:
    discovering, by the gateway, the first device via a cloud network before receiving the data from the first device.

7. A gateway comprising:
    processing circuitry configured to:
    receive data from a first device using a first protocol, wherein the first protocol is a cloud based protocol;
    determine that the received data is intended for a second device that uses a second protocol;
    identify, by the gateway, the second protocol using a unified abstraction layer that maps data to protocols to provide a consistent namespace and set of data services for information publication to a cloud layer;
    convert the received data from the first protocol to the second protocol; and
    transmit the received data to the second device via the second protocol.

8. The gateway of claim 7, wherein the first protocol and the second protocol are different protocols.

9. The gateway of claim 7, wherein the first protocol utilizes OPC unified architecture (UA).

10. The gateway of claim 7, wherein the second protocol comprises at least one of Ethernet/IP, OPC UA, ProfiNet, IEC-61850, Modbus/TCP, HART/IP, or Modbus/RTU.

11. The gateway of claim 7, wherein the processing circuitry is further configured to:
    receive data from the second device via the second protocol in response transmitting the data to the second device.

12. The gateway of claim 7, wherein the processing circuitry is further configured to:
    discover the first device via a cloud network before receiving the data from the first device.

13. A non-transitory, computer-readable medium storing one or more executable instructions that, when executed by one or more processors, cause the one or more processors to:
    receive data from a first device using a first protocol, wherein the first protocol is a cloud based protocol;
    determine that the received data is intended for a second device that uses a second protocol;
    identify, by the gateway, the second protocol using a unified abstraction layer that maps data to protocols to provide a consistent namespace and set of data services for information publication to a cloud layer;
    convert the received data from the first protocol to the second protocol; and
    transmit the received data to the second device via the second protocol.

14. The non-transitory, computer-readable medium of claim 13, wherein the first protocol and the second protocol are different protocols.

15. The non-transitory, computer-readable medium of claim 13, wherein the first protocol utilizes OPC unified architecture (UA).

16. The non-transitory, computer-readable medium of claim 13, wherein the one or more executable instructions, when executed by the one or more processors, further cause the one or more processors to:
   receive data from the second device via the second protocol in response transmitting the data to the second device.

17. The non-transitory, computer-readable medium of claim 13, wherein the one or more executable instructions, when executed by the one or more processors, further cause the one or more processors to:
   discover the first device via a cloud network before receiving the data from the first device.

* * * * *